(12) United States Patent
Pezeshki et al.

(10) Patent No.: US 11,540,239 B2
(45) Date of Patent: Dec. 27, 2022

(54) SYNCHRONIZATION SIGNAL BLOCK TRANSMISSION USING SPATIAL DIVISION MULTIPLEXING

(71) Applicant: QUALCOMM Incorporated, San Diego, CA (US)

(72) Inventors: Hamed Pezeshki, San Diego, CA (US); Tao Luo, San Diego, CA (US); Sony Akkarakaran, Poway, CA (US); Mahmoud Taherzadeh Boroujeni, San Diego, CA (US); Arumugam Chendamarai Kannan, San Diego, CA (US); Jingchao Bao, San Diego, CA (US); Taesang Yoo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 83 days.

(21) Appl. No.: 17/248,312

(22) Filed: Jan. 19, 2021

(65) Prior Publication Data
US 2021/0235402 A1 Jul. 29, 2021

Related U.S. Application Data

(60) Provisional application No. 62/965,490, filed on Jan. 24, 2020.

(51) Int. Cl.
*H04W 56/00* (2009.01)
*H04B 7/06* (2006.01)
*H04W 16/28* (2009.01)

(52) U.S. Cl.
CPC ........ *H04W 56/001* (2013.01); *H04B 7/0697* (2013.01); *H04W 16/28* (2013.01)

(58) Field of Classification Search
CPC ............... H04W 56/001; H04W 16/28; H04W 74/0833; H04W 56/0015; H04B 7/0697; H04B 7/0695; H04L 5/0025; H04L 5/0048
See application file for complete search history.

(56) References Cited

U.S. PATENT DOCUMENTS

2018/0310323 A1* 10/2018 He .................... H04L 5/0023
2019/0150190 A1*  5/2019 Kim ................. H04W 56/0015
                                                370/329
(Continued)

FOREIGN PATENT DOCUMENTS

EP              3471497 A1    4/2019
WO    WO-2018144873 A1       8/2018

OTHER PUBLICATIONS

International Search Report and Written Opinion—PCT/US2021/070054—ISA/EPO—dated May 4, 2021.

(Continued)

*Primary Examiner* — Ajit Patel
*Assistant Examiner* — Wilfred Thomas
(74) *Attorney, Agent, or Firm* — Harrity & Harrity, LLP

(57) ABSTRACT

Various aspects of the present disclosure generally relate to wireless communication. In some aspects, a base station may identify, during a connected mode or an idle mode of a user equipment, a set of synchronization signal block communications, wherein the set of synchronization signal block communications includes two or more synchronization signal block communications; and transmit, to a user equipment, the set of synchronization signal block communications using spatial multiplexing, wherein the set of synchronization signal block communications are each (Continued)

transmitted concurrently using different spatial resources associated with beam sweeping transmission. Numerous other aspects are provided.

29 Claims, 5 Drawing Sheets

(56) References Cited

U.S. PATENT DOCUMENTS

| | | | |
|---|---|---|---|
| 2019/0380099 A1* | 12/2019 | Hakola | H04W 56/001 |
| 2020/0029315 A1* | 1/2020 | Lin | H04L 1/0075 |
| 2020/0205095 A1* | 6/2020 | åström | H04W 48/12 |
| 2020/0404617 A1* | 12/2020 | Murray | H04B 7/0695 |
| 2021/0058932 A1* | 2/2021 | Takeda | H04W 80/02 |
| 2022/0086671 A1* | 3/2022 | Hong | H04B 7/204 |

OTHER PUBLICATIONS

VIVO: "Discussion on Channel Structure for 2-Step RACH," 3GPP Draft, 3GPP TSG RAN WG1 #96bis, R1-1904059_Discussion on Channel Structure For 2-STEP RACH, 3rd Generation Partnership Project (3GPP), Mobile Competence Centre, 650, Route Des Lucioles, F-06921, Sophia-Antipolis Cedex, France, vol. RAN WG1, No. Xi'an, China, Apr. 8, 2019-Apr. 12, 2019, Mar. 30, 2019 (Mar. 30, 2019), XP051691264, 10 pages, Retrieved from the Internet: URL: http://www.3gpp.org/ftp/tsg%5Fran/WG1%5FRL1/TSGR1%5F96b/Docs/R1%2D1904059%2Ezip [retrieved on Mar. 30, 2019] Sections 2.1, 2.4. 2.7. p. 1-p. 5.

* cited by examiner

SYNCHRONIZATION SIGNAL BLOCK TRANSMISSION USING SPATIAL DIVISION MULTIPLEXING

CROSS-REFERENCE TO RELATED APPLICATION

This Patent Application claims priority to U.S. Provisional patent Application No. 62/965,490, filed on Jan. 24, 2020, entitled "SYNCHRONIZATION SIGNAL BLOCK TRANSMISSION USING SPATIAL DIVISION MULTIPLEXING," and assigned to the assignee hereof. The disclosure of the prior Applications is considered part of and is incorporated by reference into this Patent Application.

FIELD OF THE DISCLOSURE

Aspects of the present disclosure generally relate to wireless communication and to techniques and apparatuses for synchronization signal block transmission using spatial division multiplexing.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless communication network may include a number of base stations (BSs) that can support communication for a number of user equipment (UEs). A user equipment (UE) may communicate with a base station (BS) via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, and/or the like.

The above multiple access technologies have been adopted in various telecommunication standards to provide a common protocol that enables different user equipment to communicate on a municipal, national, regional, and even global level. New Radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE and NR technologies. Preferably, these improvements should be applicable to other multiple access technologies and the telecommunication standards that employ these technologies.

SUMMARY

In some aspects, a method of wireless communication, performed by a base station (B S), may include identifying, during a connected mode or an idle mode of a user equipment, a set of synchronization signal block communications, wherein the set of synchronization signal block communications includes two or more synchronization signal block communications; and transmitting the set of synchronization signal block communications using spatial multiplexing, wherein the set of synchronization signal block communications are each transmitted concurrently using different spatial resources associated with beam sweeping transmission.

In some aspects, a method of wireless communication, performed by a user equipment (UE), may include receiving, during a connected mode or an idle mode and from a base station, signaling identifying spatial resources of a set of synchronization signal block communications, wherein the set of synchronization signal block communications includes two or more synchronization signal block communications; receiving at least one of the set of synchronization signal block communications using spatial multiplexing corresponding to the spatial resources, wherein the set of synchronization signal block communications are each received concurrently using different spatial resources associated with beam sweeping transmission; and determining, based at least in part on receiving the at least one of the set of synchronization signal block communications, a set of channel measurements.

In some aspects, an apparatus for wireless communication may include at least one processor operatively coupled to a memory, the memory and the at least one processor configured to identify, during a connected mode or an idle mode of a user equipment, a set of synchronization signal block communications, wherein the set of synchronization signal block communications includes two or more synchronization signal block communications; and transmit the set of synchronization signal block communications using spatial multiplexing, wherein the set of synchronization signal block communications are each transmitted concurrently using different spatial resources associated with beam sweeping transmission.

In some aspects, an apparatus for wireless communication may include at least one processor operatively coupled to a memory, the memory and the at least one processor configured to receive, during a connected mode or an idle mode and from a base station, signaling identifying spatial resources of a set of synchronization signal block communications, wherein the set of synchronization signal block communications includes two or more synchronization signal block communications; receive at least one of the set of synchronization signal block communications using spatial multiplexing corresponding to the spatial resources, wherein the set of synchronization signal block communications are each received concurrently using different spatial resources associated with beam sweeping transmission; and determine, based at least in part on receiving the at least one of the set of synchronization signal block communications, a set of channel measurements.

In some aspects, a non-transitory computer-readable medium storing computer executable code for wireless communication, comprising code for identifying, during a connected mode or an idle mode of a user equipment, a set of synchronization signal block communications, wherein the set of synchronization signal block communications includes two or more synchronization signal block communications; and transmitting the set of synchronization signal block communications using spatial multiplexing, wherein the set of synchronization signal block communications are each transmitted concurrently using different spatial resources associated with beam sweeping transmission.

In some aspects, a non-transitory computer-readable medium storing computer executable code for wireless communication, comprising code for receiving, during a connected mode or an idle mode and from a base station, signaling identifying spatial resources of a set of synchronization signal block communications, wherein the set of synchronization signal block communications includes two or more synchronization signal block communications; receiving at least one of the set of synchronization signal block communications using spatial multiplexing corresponding to the spatial resources, wherein the set of synchronization signal block communications are each received concurrently using different spatial resources associated with beam sweeping transmission; and determining, based at least in part on receiving the at least one of the set of synchronization signal block communications, a set of channel measurements.

In some aspects, an apparatus for wireless communication may include means for identifying, during a connected mode or an idle mode of a user equipment, a set of synchronization signal block communications, wherein the set of synchronization signal block communications includes two or more synchronization signal block communications; and means for transmitting the set of synchronization signal block communications using spatial multiplexing, wherein the set of synchronization signal block communications are each transmitted concurrently using different spatial resources associated with beam sweeping transmission.

In some aspects, an apparatus for wireless communication may include means for receiving, during a connected mode or an idle mode and from a base station, signaling identifying spatial resources of a set of synchronization signal block communications, wherein the set of synchronization signal block communications includes two or more synchronization signal block communications; means for receiving at least one of the set of synchronization signal block communications using spatial multiplexing corresponding to the spatial resources, wherein the set of synchronization signal block communications are each received concurrently using different spatial resources associated with beam sweeping transmission; and means for determining, based at least in part on receiving the at least one of the set of synchronization signal block communications, a set of channel measurements.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with 3G and/or 4G wireless technologies, aspects of the present disclosure can be applied in other generation-based communication systems, such as 5G and later, including NR technologies.

Figure 1:
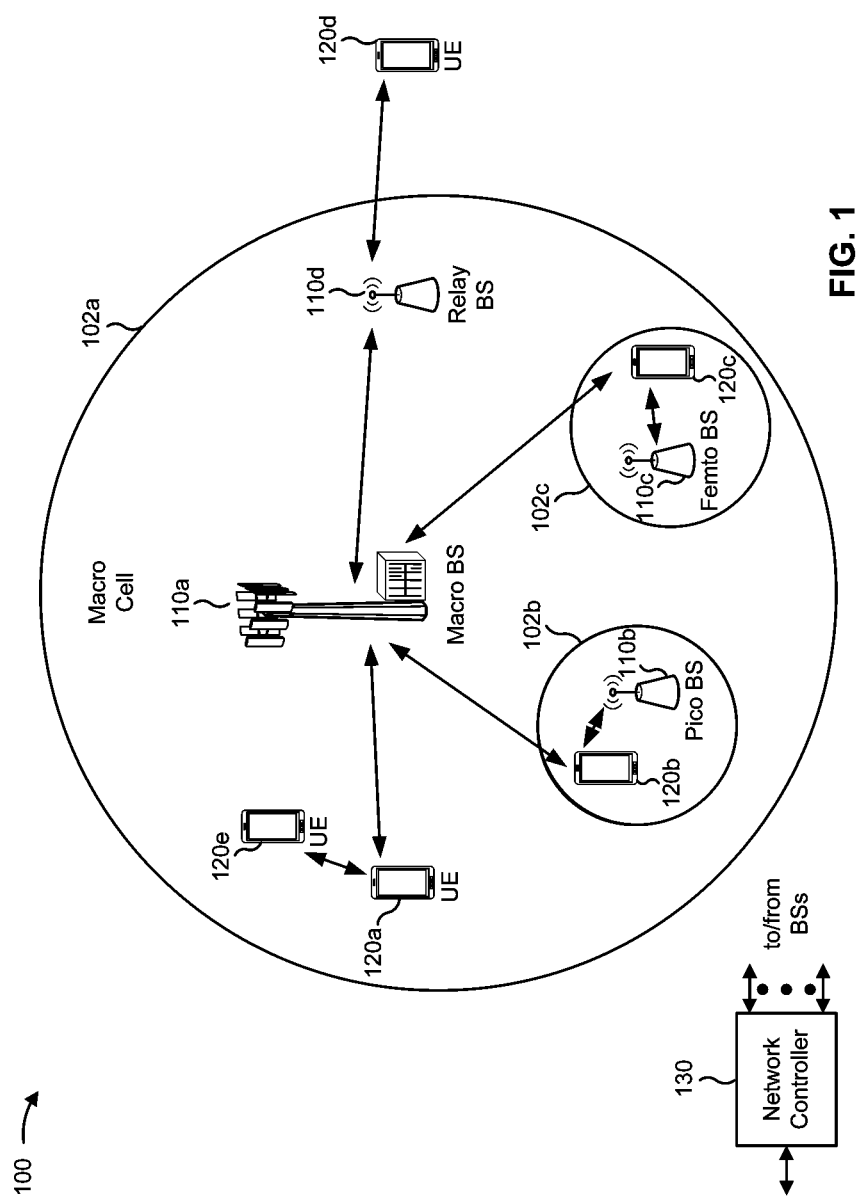
FIG. 1 is a diagram illustrating an example of a wireless communication network, in accordance with various aspects of the present disclosure.

FIG. 1 is a diagram illustrating a wireless network 100 in which aspects of the present disclosure may be practiced. The wireless network 100 may be an LTE network or some other wireless network, such as a 5G or NR network. The wireless network 100 may include a number of BSs 110 (shown as BS 110a, BS 110b, BS 110c, and BS 110d) and other network entities. ABS is an entity that communicates with user equipment (UEs) and may also be referred to as a base station, a NR BS, a Node B, a gNB, a 5G node B (NB), an access point, a transmit receive point (TRP), and/or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). ABS for a macro cell may be referred to as a macro BS. ABS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110d may communicate with macro BS 110a and a UE 120d in order to facilitate communication between BS 110a and UE 120d. A relay station may also be referred to as a relay BS, a relay base station, a relay, and/or the like.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impacts on interference in wireless network 100. For example, macro BSs may have a high transmit power level (e.g., 5 to 40 Watts) whereas pico BSs, femto BSs, and relay BSs may have lower transmit power levels (e.g., 0.1 to 2 Watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components, memory components, and/or the like.

In general, any number of wireless networks may be deployed in a given geographic area. Each wireless network may support a particular radio access technology (RAT) and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere herein as being performed by the base station 110.

As indicated above, FIG. 1 is provided as an example. Other examples may differ from what is described with regard to FIG. 1.

Figure 2:
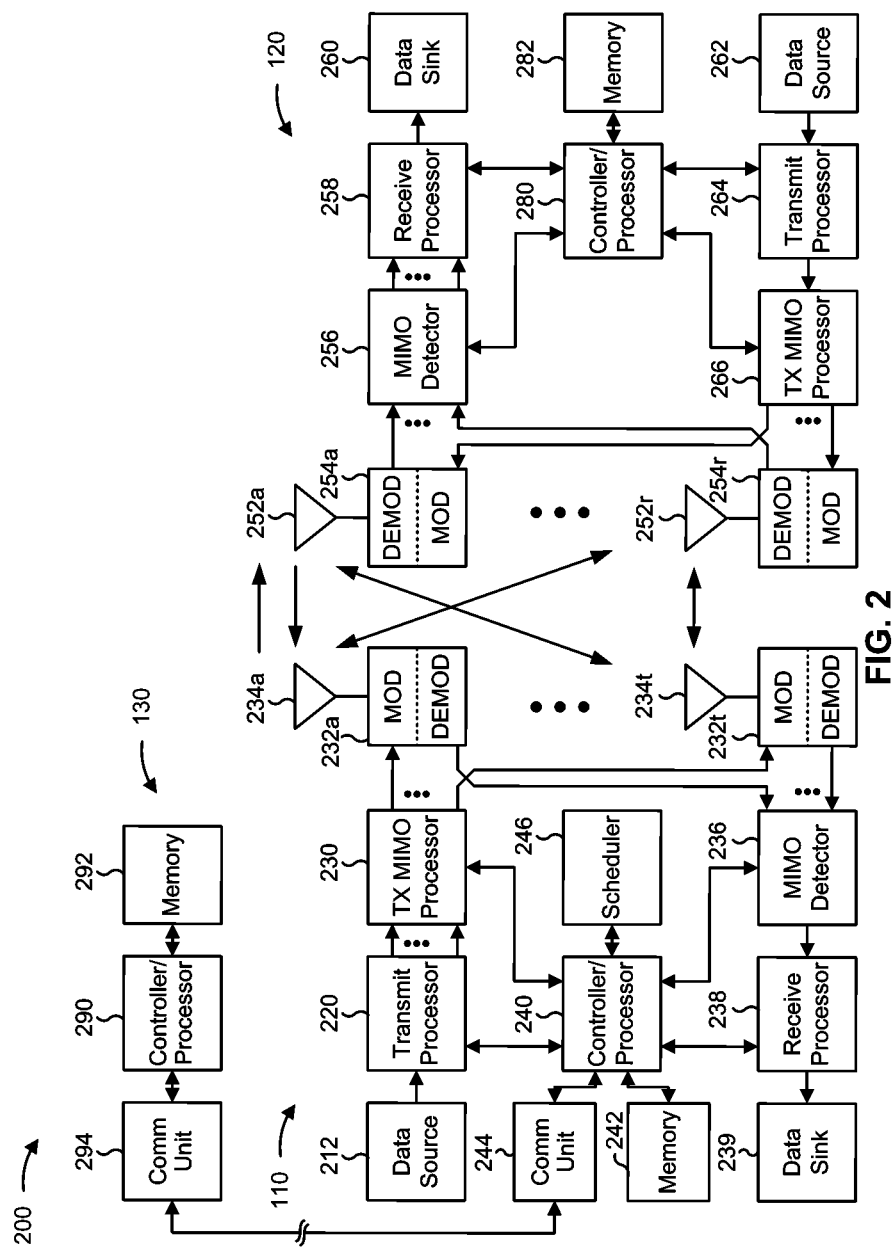
FIG. 2 is a diagram illustrating an example of a base station in communication with a UE in a wireless communication network, in accordance with various aspects of the present disclosure.

FIG. 2 shows a block diagram of a design 200 of base station 110 and UE 120, which may be one of the base stations and one of the UEs in FIG. 1. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI) and/or the like) and control information (e.g., CQI requests, grants, upper layer signaling, and/or the like) and provide overhead symbols and control symbols. Transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively. According to various aspects described in more detail below, the synchronization signals can be generated with location encoding to convey additional information.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols.

A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like. In some aspects, one or more components of UE 120 may be included in a housing.

On the uplink, at UE 120, a transmit processor 264 may receive and process data from a data source 262 and control information (e.g., for reports comprising RSRP, RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM, and/or the like), and transmitted to base station 110. At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Network controller 130 may include communication unit 294, controller/processor 290, and memory 292.

Controller/processor 240 of base station 110, controller/processor 280 of UE 120, and/or any other component(s) of FIG. 2 may perform one or more techniques associated with synchronization signal block transmission using spatial division multiplexing, as described in more detail elsewhere herein. For example, controller/processor 240 of base station 110, controller/processor 280 of UE 120, and/or any other component(s) of FIG. 2 may perform or direct operations of, for example, process 400 of FIG. 4, process 500 of FIG. 5, and/or other processes as described herein. Memories 242 and 282 may store data and program codes for base station 110 and UE 120, respectively. In some aspects, memory 242 and/or memory 282 may comprise a non-transitory computer-readable medium storing one or more instructions for wireless communication. For example, the one or more instructions, when executed by one or more processors of the base station 110 and/or the UE 120, may perform or direct operations of, for example, process 400 of FIG. 4, process 500 of FIG. 5, and/or other processes as described herein. A scheduler 246 may schedule UEs for data transmission on the downlink and/or uplink.

In some aspects, UE 120 may include means for receiving, during a connected mode or an idle mode and from a base station, signaling identifying spatial resources of a set of synchronization signal block communications, wherein the set of synchronization signal block communications includes two or more synchronization signal block communications, means for receiving at least one of the set of synchronization signal block communications using spatial multiplexing corresponding to the spatial resources, wherein the set of synchronization signal block communications are each received concurrently using different spatial resources associated with beam sweeping transmission, means for determining, based at least in part on receiving the at least one of the set of synchronization signal block communications, a set of channel measurements, and/or the like. In some aspects, such means may include one or more components of UE 120 described in connection with FIG. 2, such as controller/processor 280, transmit processor 264, TX MIMO processor 266, MOD 254, antenna 252, DEMOD 254, MIMO detector 256, receive processor 258, and/or the like.

In some aspects, base station 110 may include means for identifying, during a connected mode or an idle mode of a user equipment, a set of synchronization signal block communications, wherein the set of synchronization signal block communications includes two or more synchronization signal block communications, means for transmitting the set of synchronization signal block communications using spatial multiplexing, wherein the set of synchronization signal block communications are each transmitted concurrently using different spatial resources associated with beam sweeping transmission, and/or the like. In some aspects, such means may include one or more components of base station 110 described in connection with FIG. 2, such as antenna 234, DEMOD 232, MIMO detector 236, receive processor 238, controller/processor 240, transmit processor 220, TX MIMO processor 230, MOD 232, antenna 234, and/or the like.

As indicated above, FIG. 2 is provided as an example. Other examples may differ from what is described with regard to FIG. 2.

In some communications systems, a BS may transmit a synchronization signal block (SSB) communication to enable a UE to perform one or more measurements associated with configuring communication. For example, a UE may receive an SSB communication and perform a reference signal received power (RSRP) measurement to enable configuration of communication parameters for subsequent communications. The BS may use time division multiplexing to transmit a plurality of SSB communications, which may increase a likelihood of the UE successfully receiving at least one of the plurality of SSB communications. However, SSB communications may be associated with an excessive amount of overhead.

Some aspects described herein enable spatial multiplexing of SSB transmissions for beam sweeping. For example, a BS may transmit a plurality of SSBs with different spatial characteristics when beam sweeping. In this case, based at least in part on using spatial multiplexing, the BS and/or the UE may reduce overhead, achieve UE power savings, and/or the like. In this case, the UE may perform RSRP measurements on the spatially multiplexed SSB communications, thereby enabling configuration of communication parameters for subsequent communication.

Figure 3:
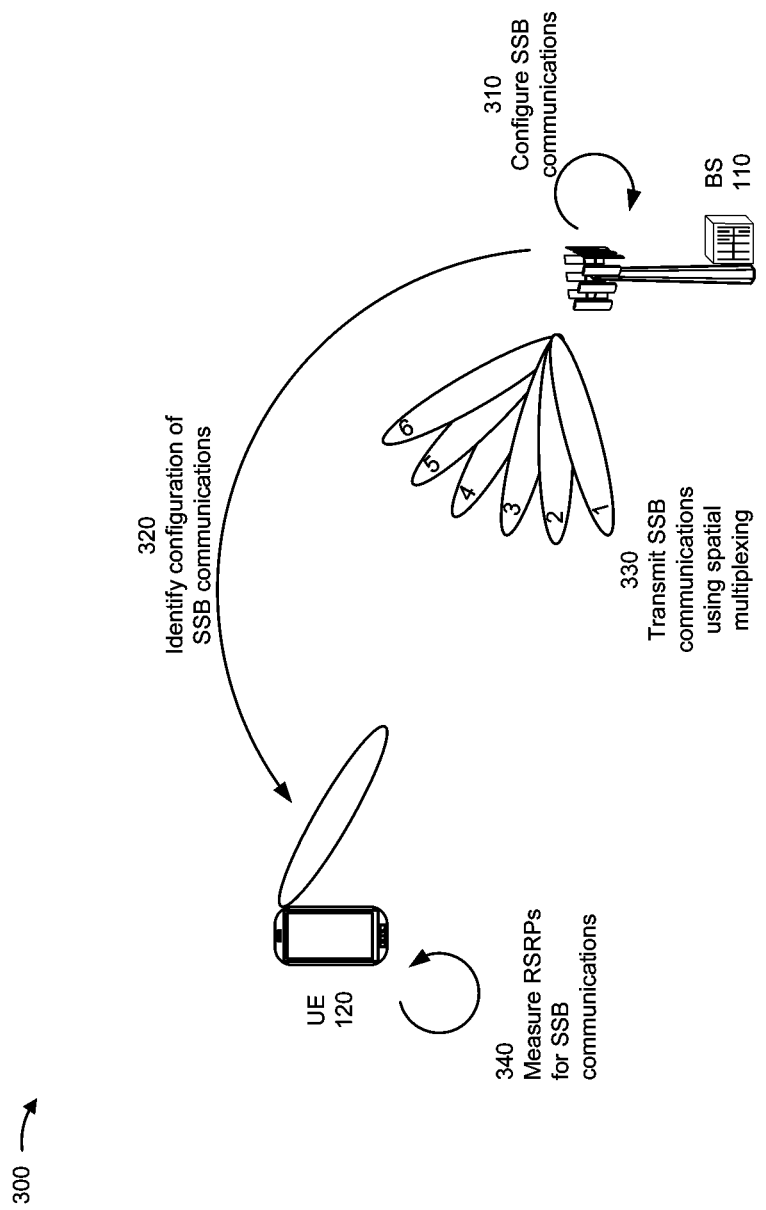
FIG. 3 is a diagram illustrating an example of synchronization signal block transmission using spatial division multiplexing, in accordance with various aspects of the present disclosure.

FIG. 3 is a diagram illustrating an example 300 of SSB transmission using spatial division multiplexing, in accordance with various aspects of the present disclosure. As shown in FIG. 3, example 300 includes a BS 110 and a UE 120.

As further shown in FIG. 3, and by reference number 310, BS 110 may configure SSB communications. For example, BS 110 may configure spatial division multiplexing (which may be termed spatial multiplexing) for a set of SSB communications (e.g., two or more SSB communications). In this case, to perform beam sweeping across a set of beams {1, 2, 3, 4, 5, 6}, BS 110 may configure multiple subsets of spatially multiplexed SSB communications. For example, BS 110 may configure beam sweeping a first set of SSB communications using a first set of beams {1, 4}, a second set of SSB communications using a second set of beams {2, 5}, and a third set of SSB communications using a third set of beams {3, 6}. In this case, BS 110 may determine to beam sweep across the three sets [{1, 4}, {2, 5}, {3, 6}], thereby enabling decreased measurement overhead for UE 120. Although some aspects are described herein in terms of two SSB communications being spatially multiplexed onto two beams, other quantities of SSB communications on other quantities of beams are contemplated.

In some aspects, BS 110 may select the multiple sets of beams for the multiple sets of spatially multiplexed SSB communications to achieve a threshold spatial separation. For example, BS 110 may determine to transmit using beams 1 and 4 concurrently based at least in part on an angular separation between beams 1 and 4 being larger than, for example, an angular separation between beams 3 and 4.

In some aspects, BS 110 may configure demodulation reference sequences for the SSB communications. For example, BS 110 may assign orthogonal demodulation reference signal (DMRS) sequences to SSB communications that are to be transmitted concurrently (e.g., a first DMRS to a first SSB communication on beam 1, and a second DMRS, which is orthogonal to the first DMRS, to a second SSB communication on beam 2). In this way, BS 110 may enable UE 120 to differentiate between SSB communications on different beams and measure separate channel quality parameters for each SSB communication. In some aspects, BS 110 may configure orthogonality for the first DMRS and the second DMRS with respect to differing times, differing frequencies, differing codes (e.g., differing overlay Walsh codes), and/or the like.

In some aspects, BS 110 may configure differing physical broadcast channel (PBCH) payloads for the SSB communications. For example, BS 110 may cause a first SSB communication to have a first PBCH payload and a second SSB communication to have a second PBCH payload. In this case, the first PBCH payload may differ from the second PBCH payload with respect to corresponding SSB indices of the respective PBCH payloads. Alternatively, the first PBCH payload and the second PBCH payload may be portions of a common payload.

As further shown in FIG. 3, and by reference number 320, BS 110 may transmit information identifying a configuration of the SSB communications to UE 120. For example, BS 110 may provide information indicating that UE 120 is to concurrently receive SSB communications on a first set of beams {1, 4} at a first time, a second set of beams {2, 5} at a second time, a third set of beams {3, 6} at a third time, and/or the like. In some aspects, BS 110 may provide the information identifying the configuration of the SSB communications using a PBCH. For example, BS 110 may provide a compressed indication in the PBCH to convey information regarding spatial multiplexing of the SSB communications. Additionally, or alternatively, BS 110 may provide a bitmap using connected mode radio resource control (RRC) signaling to convey information regarding spatial multiplexing of the SSB communications. In this case, the bitmap may have bits to indicate whether an SSB communication is to be transmitted on a particular beam. In some aspects, BS 110 may include an explicit indication of a quantity of transmission layers (e.g., 1 layer, 2 layers, and/or the like) for the SSB communication being transmitted on the particular beam. Alternatively, UE 120 may implicitly derive the quantity of transmission layers, such as based at least in part on a stored, default configuration.

As further shown in FIG. 3, and by reference number 330, BS 110 may transmit, to UE 120, the SSB communications using spatial multiplexing. For example, BS 110 may, at a first time, transmit a first SSB communication on beam 1 and a second SSB communication on beam 4. Similarly, at a second time, BS 110 may transmit a third SSB communication on beam 2 and a fourth SSB communication on beam 5. Similarly, at a third time, BS 110 may transmit a fifth SSB communication on beam 3 and a sixth SSB communication on beam 6. In this case, UE 120 may receive one or more of the SSB communications on one or more of the beams.

In some aspects, BS 110 may transmit one or more additional SSB communications that are not spatially multiplexed with another SSB communication. For example, at a fourth time, BS 110 may transmit a single SSB communication on a beam that has already been used (e.g., one of beams 1-6), on a beam that has not been used (e.g., on a beam 7 or higher), and/or the like. In some aspects, BS 110 may associate the SSB communications with random access channel resources. For example, each beam (and each associated SSB communication) may have a corresponding random access channel resource (rather than a random access channel resource for each SSB communication occasion, in which multiple SSB communications may occur on multiple beams).

As further shown in FIG. 3, and by reference number 340, UE 120 may perform one or more measurements of the SSB communications. For example, UE 120 may perform a channel quality measurement, such as a reference signal received power (RSRP) measurement, a reference signal received quality (RSRQ) measurement, and/or the like. In this way, UE 120 may subsequently communicate with BS 110 in accordance with the one or more measurements of the SSB communications.

As indicated above, FIG. 3 is provided as an example. Other examples may differ from what is described with respect to FIG. 3.

Figure 4:
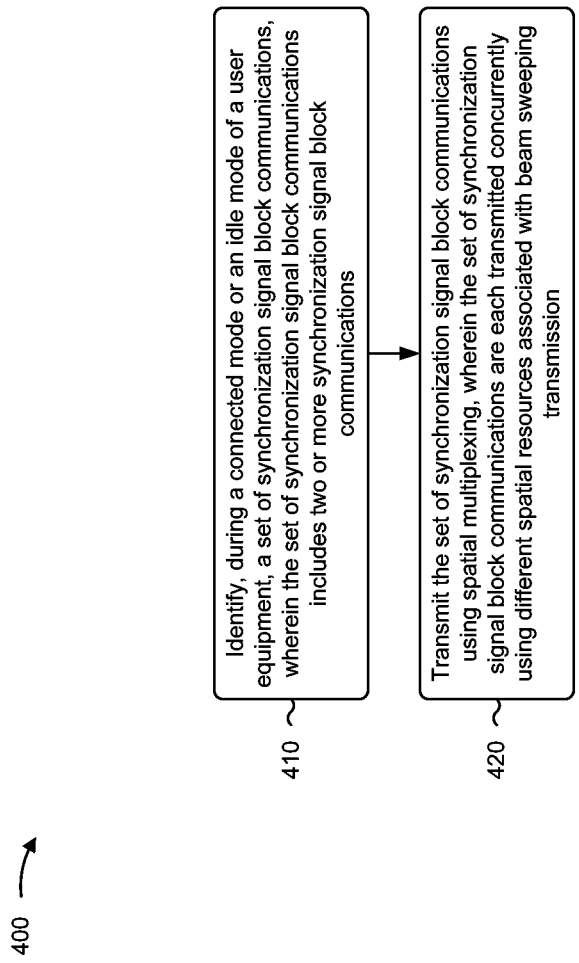
FIG. 4 is a diagram illustrating an example process performed, for example, by a base station, in accordance with various aspects of the present disclosure.

FIG. 4 is a diagram illustrating an example process 400 performed, for example, by a BS, in accordance with various aspects of the present disclosure. Example process 400 is an example where the BS (e.g., BS 110 and/or the like) performs operations associated with synchronization signal block transmission using spatial division multiplexing.

As shown in FIG. 4, in some aspects, process 400 may include identifying, during a connected mode or an idle mode of a user equipment, a set of synchronization signal block communications, wherein the set of synchronization signal block communications includes two or more synchronization signal block communications (block 410). For example, the BS (e.g., using transmit processor 220, receive processor 238, controller/processor 240, memory 242, and/or the like) may identify, during a connected mode or an idle mode of a user equipment, a set of synchronization signal block communications, as described above. In some aspects, the set of synchronization signal block communications includes two or more synchronization signal block communications.

As further shown in FIG. 4, in some aspects, process 400 may include transmitting the set of synchronization signal block communications using spatial multiplexing, wherein the set of synchronization signal block communications are each transmitted concurrently using different spatial resources associated with beam sweeping transmission (block 420). For example, the BS (e.g., using transmit processor 220, receive processor 238, controller/processor 240, memory 242, and/or the like) may transmit the set of synchronization signal block communications using spatial multiplexing, as described above. In some aspects, the set of synchronization signal block communications are each transmitted concurrently using different spatial resources associated with beam sweeping transmission.

Process 400 may include additional aspects, such as any single aspect or any combination of aspects described below and/or in connection with one or more other processes described elsewhere herein.

In a first aspect, transmitting the set of synchronization signal block communications includes transmitting two or more sets of synchronization signal block communications, which include the set of synchronization signal block communications, using beam sweeping, wherein each set of synchronization signal block communications, of the two or more sets of synchronization signal block communications, includes two or more concurrently transmitted, spatially multiplexed synchronization signal block communications.

In a second aspect, alone or in combination with the first aspect, synchronization signal block communications, of the set of synchronization signal block communications, are associated with orthogonal demodulation reference signal sequences.

In a third aspect, alone or in combination with one or more of the first and second aspects, the orthogonal demodulation reference signal sequences are orthogonal with respect to at least one of: time, frequency, code, or a combination thereof.

In a fourth aspect, alone or in combination with one or more of the first through third aspects, synchronization signal block communications, of the set of synchronization signal block communications, are associated with respective physical broadcast channel payloads that only differ with respect to respective synchronization signal block indices of the physical broadcast channel payloads.

In a fifth aspect, alone or in combination with one or more of the first through fourth aspects, synchronization signal block communications, of the set of synchronization signal block communications, are associated with a common physical broadcast channel payload.

In a sixth aspect, alone or in combination with one or more of the first through fifth aspects, process 400 includes transmitting at least one synchronization signal block communication, not in the set of synchronization signal block communications, that is not spatially multiplexed with any other synchronization signal block communication.

In a seventh aspect, alone or in combination with one or more of the first through sixth aspects, process 400 includes transmitting signaling identifying spatial resources of the set of synchronization signal block communications.

In an eighth aspect, alone or in combination with one or more of the first through seventh aspects, the signaling is at least one of an indication in a physical broadcast channel, or an indication in connected mode radio resource control signaling.

In a ninth aspect, alone or in combination with one or more of the first through eighth aspects, the signaling explicitly indicates whether a synchronization signal block communication of the set of synchronization signal block communications is transmitted and implicitly indicates that the synchronization signal block communication is a two layer transmission.

In a tenth aspect, alone or in combination with one or more of the first through ninth aspects, the signaling explicitly indicates whether a synchronization signal block communication of the set of synchronization signal block communications is transmitted and explicitly indicates a quantity of transmission layers of the synchronization signal block communication.

In an eleventh aspect, alone or in combination with one or more of the first through tenth aspects, synchronization signal block occasions that include resources for the set of synchronization signal block communications are associated with corresponding random access channel resources.

In a twelfth aspect, alone or in combination with one or more of the first through eleventh aspects, each random access channel resource, of the corresponding random access channel resources, corresponds to each spatially division multiplexed beam of each synchronization signal block communication of the set of synchronization signal block communications.

Although FIG. 4 shows example blocks of process 400, in some aspects, process 400 may include additional blocks, fewer blocks, different blocks, or differently arranged blocks than those depicted in FIG. 4. Additionally, or alternatively, two or more of the blocks of process 400 may be performed in parallel.

Figure 5:
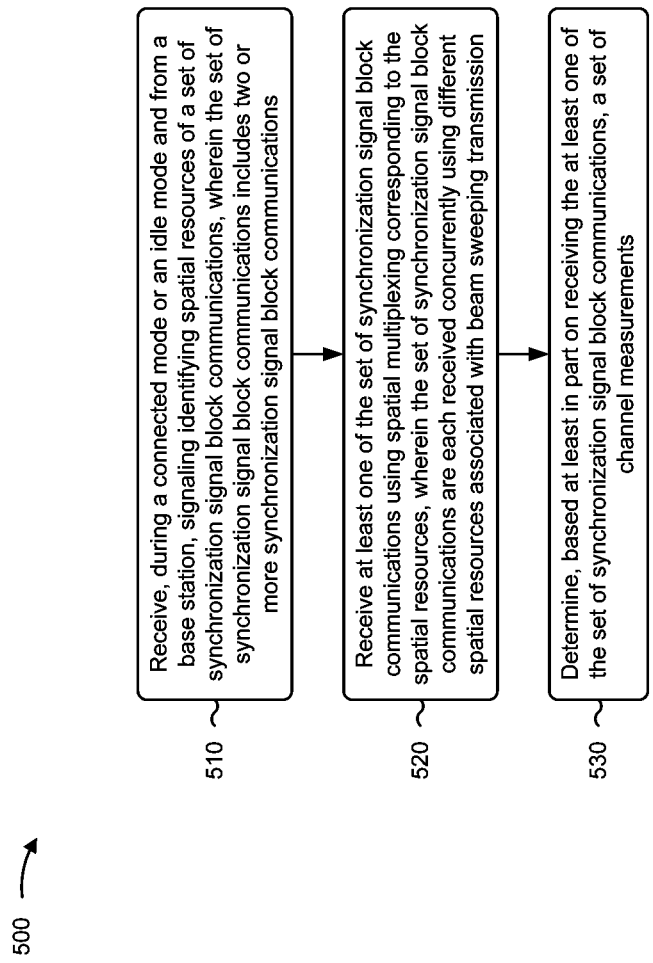
FIG. 5 is a diagram illustrating an example process performed, for example, by a user equipment, in accordance with various aspects of the present disclosure.

FIG. 5 is a diagram illustrating an example process 500 performed, for example, by a UE, in accordance with various aspects of the present disclosure. Example process 500 is an example where the UE (e.g., UE 120 and/or the like) performs operations associated with synchronization signal block transmission using spatial division multiplexing.

As shown in FIG. 5, in some aspects, process 500 may include receiving, during a connected mode or an idle mode and from a base station, signaling identifying spatial resources of a set of synchronization signal block communications, wherein the set of synchronization signal block communications includes two or more synchronization signal block communications (block 510). For example, the UE (e.g., using receive processor 258, transmit processor 264, controller/processor 280, memory 282, and/or the like) may receive, during a connected mode or an idle mode and from a base station, signaling identifying spatial resources of a set of synchronization signal block communications, as described above. In some aspects, the set of synchronization signal block communications includes two or more synchronization signal block communications.

As further shown in FIG. 5, in some aspects, process 500 may include receiving at least one of the set of synchronization signal block communications using spatial multiplexing corresponding to the spatial resources, wherein the set of synchronization signal block communications are each received concurrently using different spatial resources associated with beam sweeping transmission (block 520). For example, the UE (e.g., using receive processor 258, transmit processor 264, controller/processor 280, memory 282, and/or or the like) may receive at least one of the set of synchronization signal block communications using spatial multiplexing corresponding to the spatial resources, as described above. In some aspects, the set of synchronization signal block communications are each received concurrently using different spatial resources associated with beam sweeping transmission.

As further shown in FIG. 5, in some aspects, process 500 may include determining, based at least in part on receiving the at least one of the set of synchronization signal block communications, a set of channel measurements (block 530). For example, the UE (e.g., using receive processor 258, transmit processor 264, controller/processor 280, memory 282, and/or the like) may determine, based at least in part on receiving the at least one of the set of synchronization signal block communications, a set of channel measurements, as described above.

Process 500 may include additional aspects, such as any single aspect or any combination of aspects described below and/or in connection with one or more other processes described elsewhere herein.

In a first aspect, the set of channel measurements includes a set of reference signal received power measurements.

In a second aspect, alone or in combination with the first aspect, process 500 includes communicating with the base station based at least in part on the set of channel measurements.

In a third aspect, alone or in combination with one or more of the first and second aspects, receiving the at least one of the set of synchronization signal block communications includes receiving at least one of two or more sets of synchronization signal block communications, which includes the set of synchronization signal block communications, using beam sweeping, wherein each set of synchronization signal block communications, of the two or more sets of synchronization signal block communications, includes two or more concurrently transmitted, spatially multiplexed synchronization signal block communications.

In a fourth aspect, alone or in combination with one or more of the first through third aspects, synchronization signal block communications, of the set of synchronization signal block communications, are associated with orthogonal demodulation reference signal sequences.

In a fifth aspect, alone or in combination with one or more of the first through fourth aspects, the orthogonal demodulation reference signal sequences are orthogonal with respect to at least one of: time, frequency, code, or a combination thereof.

In a sixth aspect, alone or in combination with one or more of the first through fifth aspects, synchronization signal block communications, of the set of synchronization signal block communications, are associated with respective physical broadcast channel payloads that only differ with respect to respective synchronization signal block indices of the physical broadcast channel payloads.

In a seventh aspect, alone or in combination with one or more of the first through sixth aspects, synchronization signal block communications, of the set of synchronization signal block communications, are associated with a common physical broadcast channel payload.

In an eighth aspect, alone or in combination with one or more of the first through seventh aspects, process 500 includes attempting to receive at least one synchronization signal block communication, not in the set of synchronization signal block communications, that is not spatially multiplexed with any other synchronization signal block communication.

In a ninth aspect, alone or in combination with one or more of the first through eighth aspects, the signaling is at least one of an indication in a physical broadcast channel, or an indication in connected mode radio resource control signaling.

In a tenth aspect, alone or in combination with one or more of the first through ninth aspects, the signaling explicitly indicates whether a synchronization signal block communication of the set of synchronization signal block communications is to be transmitted and implicitly indicates that the synchronization signal block communication is a two layer transmission.

In an eleventh aspect, alone or in combination with one or more of the first through tenth aspects, the signaling explicitly indicates whether a synchronization signal block communications is to be transmitted and explicitly indicates a quantity of transmission layers of the synchronization signal block communication.

In a twelfth aspect, alone or in combination with one or more of the first through eleventh aspects, synchronization signal block occasions that include resources for the set of synchronization signal block communications are associated with corresponding random access channel resources.

In a thirteenth aspect, alone or in combination with one or more of the first through twelfth aspects, each random access channel resource, of the corresponding random access channel resources, corresponds to each spatially division multiplexed beam of each synchronization signal block communication of the set of synchronization signal block communications.

Although FIG. 5 shows example blocks of process 500, in some aspects, process 500 may include additional blocks, fewer blocks, different blocks, or differently arranged blocks than those depicted in FIG. 5. Additionally, or alternatively, two or more of the blocks of process 500 may be performed in parallel.

The following provides an overview of some aspects of the present disclosure:

Aspect 1: A method of wireless communication performed by a base station (BS), comprising: identifying, during a connected mode or an idle mode of a user equipment, a set of synchronization signal block communications, wherein the set of synchronization signal block communications includes two or more synchronization signal block communications; and transmitting the set of synchronization signal block communications using spatial multiplexing, wherein the set of synchronization signal block communications are each transmitted concurrently using different spatial resources associated with beam sweeping transmission.

Aspect 2: The method of aspect 1, wherein transmitting the set of synchronization signal block communications comprises: transmitting two or more sets of synchronization signal block communications, which includes the set of synchronization signal block communications, using beam sweeping, wherein each set of synchronization signal block communications, of the two or more sets of synchronization signal block communications, includes two or more concurrently transmitted, spatially multiplexed synchronization signal block communications.

Aspect 3: The method of any of aspects 1 to 2, wherein synchronization signal block communications, of the set of synchronization signal block communications, are associated with orthogonal demodulation reference signal sequences.

Aspect 4: The method of aspect 3, wherein the orthogonal demodulation reference signal sequences are orthogonal with respect to at least one of: time, frequency, code, or a combination thereof.

Aspect 5: The method of any of aspects 1 to 4, wherein synchronization signal block communications, of the set of synchronization signal block communications, are associated with respective physical broadcast channel payloads that only differ with respect to respective synchronization signal block indices of the physical broadcast channel payloads.

Aspect 6: The method of any of aspects 1 to 5, wherein synchronization signal block communications, of the set of synchronization signal block communications, are associated with a common physical broadcast channel payload.

Aspect 7: The method of any of aspects 1 to 6, further comprising: transmitting at least one synchronization signal block communication, not in the set of synchronization signal block communications, that is not spatially multiplexed with any other synchronization signal block communication.

Aspect 8: The method of any of aspects 1 to 7, further comprising: transmitting signaling identifying spatial resources of the set of synchronization signal block communications.

Aspect 9: The method of aspect 8, wherein the signaling is at least one of: an indication in a physical broadcast channel, or an indication in connected mode radio resource control signaling.

Aspect 10: The method of any of aspects 8 to 9, wherein the signaling explicitly indicates whether a synchronization signal block communication of the set of synchronization signal block communications is transmitted and implicitly indicates that the synchronization signal block communication is a two layer transmission.

Aspect 11: The method of any of aspects 8 to 10, wherein the signaling explicitly indicates whether a synchronization signal block communication of the set of synchronization signal block communications is transmitted and explicitly indicates a quantity of transmission layers of the synchronization signal block communication.

Aspect 12: The method of any of aspects 1 to 11, wherein synchronization signal block occasions that include resources for the set of synchronization signal block communications are associated with corresponding random access channel resources.

Aspect 13: The method of aspect 12, wherein each random access channel resource, of the corresponding random access channel resources, corresponds to each spatially division multiplexed beam of each synchronization signal block communication of the set of synchronization signal block communications.

Aspect 14: A method for wireless communication performed by a user equipment (UE), comprising: receiving, during a connected mode or an idle mode and from a base station, signaling identifying spatial resources of a set of synchronization signal block communications, wherein the set of synchronization signal block communications includes two or more synchronization signal block communications; receiving at least one of the set of synchronization signal block communications using spatial multiplexing corresponding to the spatial resources, wherein the set of synchronization signal block communications are each received concurrently using different spatial resources associated with beam sweeping transmission; and determining, based at least in part on receiving the at least one of the set of synchronization signal block communications, a set of channel measurements.

Aspect 15: The method of aspect 14, wherein the set of channel measurements includes a set of reference signal received power measurements.

Aspect 16: The method of any of aspects 14 to 15, further comprising: communicating with the base station based at least in part on the set of channel measurements.

Aspect 17: The method of any of aspects 14 to 16, wherein receiving the at least one of the set of synchronization signal block communications comprises: receiving at least one of two or more sets of synchronization signal block communications, which includes the set of synchronization signal block communications, using beam sweeping, wherein each set of synchronization signal block communications, of the two or more sets of synchronization signal block communications, includes two or more concurrently transmitted, spatially multiplexed synchronization signal block communications.

Aspect 18: The method of any of aspects 14 to 17, wherein synchronization signal block communications, of the set of synchronization signal block communications, are associated with orthogonal demodulation reference signal sequences.

Aspect 19: The method of aspect 18, wherein the orthogonal demodulation reference signal sequences are orthogonal with respect to at least one of: time, frequency, code, or a combination thereof.

Aspect 20: The method of any of aspects 14 to 19, wherein synchronization signal block communications, of the set of synchronization signal block communications, are associated with respective physical broadcast channel payloads that only differ with respect to respective synchronization signal block indices of the physical broadcast channel payloads.

Aspect 21: The method of any of aspects 14 to 20, wherein synchronization signal block communications, of the set of synchronization signal block communications, are associated with a common physical broadcast channel payload.

Aspect 22: The method of any of aspects 14 to 21, further comprising: attempting to receive at least one synchronization signal block communication, not in the set of synchronization signal block communications, that is not spatially multiplexed with any other synchronization signal block communication.

Aspect 23: The method of any of aspects 14 to 22, wherein the signaling is at least one of: an indication in a physical broadcast channel, or an indication in connected mode radio resource control signaling.

Aspect 24: The method of any of aspects 14 to 23, wherein the signaling explicitly indicates whether a synchronization signal block communication of the set of synchronization signal block communications is to be transmitted and implicitly indicates that the synchronization signal block communication is a two layer transmission.

Aspect 25: The method of any of aspects 14 to 24, wherein the signaling explicitly indicates whether a synchronization signal block communication of the set of synchronization signal block communications is to be transmitted and explicitly indicates a quantity of transmission layers of the synchronization signal block communication.

Aspect 26: The method of any of aspects 14 to 25, wherein synchronization signal block occasions that include resources for the set of synchronization signal block communications are associated with corresponding random access channel resources.

Aspect 27: The method of aspect 26, wherein each random access channel resource, of the corresponding random access channel resources, corresponds to each spatially division multiplexed beam of each synchronization signal block communication of the set of synchronization signal block communications.

Aspect 28: An apparatus for wireless communication at a device, comprising a processor; memory coupled with the processor; and instructions stored in the memory and executable by the processor to cause the apparatus to perform the method of one or more aspects of aspects 1-13.

Aspect 29: A device for wireless communication, comprising a memory and one or more processors coupled to the memory, the memory and the one or more processors configured to perform the method of one or more aspects of aspects 1-13.

Aspect 30: An apparatus for wireless communication, comprising at least one means for performing the method of one or more aspects of aspects 1-13.

Aspect 31: A non-transitory computer-readable medium storing code for wireless communication, the code comprising instructions executable by a processor to perform the method of one or more aspects of aspects 1-13.

Aspect 32: A non-transitory computer-readable medium storing a set of instructions for wireless communication, the set of instructions comprising one or more instructions that, when executed by one or more processors of a device, cause the device to perform the method of one or more aspects of aspects 1-13.

Aspect 33: An apparatus for wireless communication at a device, comprising a processor; memory coupled with the processor; and instructions stored in the memory and executable by the processor to cause the apparatus to perform the method of one or more aspects of aspects 14-27.

Aspect 34: A device for wireless communication, comprising a memory and one or more processors coupled to the memory, the memory and the one or more processors configured to perform the method of one or more aspects of aspects 14-27.

Aspect 35: An apparatus for wireless communication, comprising at least one means for performing the method of one or more aspects of aspects 14-27.

Aspect 36: A non-transitory computer-readable medium storing code for wireless communication, the code comprising instructions executable by a processor to perform the method of one or more aspects of aspects 14-27.

Aspect 37: A non-transitory computer-readable medium storing a set of instructions for wireless communication, the set of instructions comprising one or more instructions that, when executed by one or more processors of a device, cause the device to perform the method of one or more aspects of aspects 14-27.

The foregoing disclosure provides illustration and description, but is not intended to be exhaustive or to limit the aspects to the precise form disclosed. Modifications and variations may be made in light of the above disclosure or may be acquired from practice of the aspects.

As used herein, the term "component" is intended to be broadly construed as hardware, firmware, and/or a combination of hardware and software. As used herein, a processor is implemented in hardware, firmware, and/or a combination of hardware and software.

As used herein, satisfying a threshold may, depending on the context, refer to a value being greater than the threshold, greater than or equal to the threshold, less than the threshold, less than or equal to the threshold, equal to the threshold, not equal to the threshold, and/or the like.

It will be apparent that systems and/or methods described herein may be implemented in different forms of hardware, firmware, and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," and/or the like are intended to be open-ended terms. Further, the phrase "based on" is intended to mean "based, at least in part, on" unless explicitly stated otherwise.

What is claimed is:

1. An apparatus for wireless communication, comprising:
a memory; and
one or more processors, coupled to the memory, configured to:
identify, during a connected mode or an idle mode of a user equipment, a set of synchronization signal block communications, wherein the set of synchronization signal block communications includes two or more synchronization signal block communications;
transmit, to the user equipment, signaling identifying spatial resources of the set of synchronization signal block communications, wherein the spatial resources correspond to one or more beams; and
transmit, based at least in part on the spatial resources, the set of synchronization signal block communications using spatial multiplexing, wherein the set of synchronization signal block communications are each transmitted concurrently using the spatial resources associated with the one or more beams in a beam sweeping transmission.

2. The apparatus of claim 1, wherein the one or more processors, when transmitting the set of synchronization signal block communications, are configured to:
transmit two or more sets of synchronization signal block communications, which includes the set of synchronization signal block communications, using beam sweeping,
wherein each set of synchronization signal block communications, of the two or more sets of synchronization signal block communications, includes two or more concurrently transmitted, spatially multiplexed synchronization signal block communications.

3. The apparatus of claim 1, wherein synchronization signal block communications, of the set of synchronization signal block communications, are associated with orthogonal demodulation reference signal sequences.

4. The apparatus of claim 3, wherein the orthogonal demodulation reference signal sequences are orthogonal with respect to at least one of: time, frequency, code, or a combination thereof.

5. The apparatus of claim 1, wherein synchronization signal block communications, of the set of synchronization signal block communications, are associated with respective physical broadcast channel payloads that only differ with respect to respective synchronization signal block indices of the physical broadcast channel payloads.

6. The apparatus of claim 1, wherein synchronization signal block communications, of the set of synchronization signal block communications, are associated with a common physical broadcast channel payload.

7. The apparatus of claim 1, wherein the one or more processors are further configured to:
transmit at least one synchronization signal block communication, not in the set of synchronization signal block communications, that is not spatially multiplexed with any other synchronization signal block communication.

8. The apparatus of claim 1, wherein the signaling is at least one of:
an indication in a physical broadcast channel, or
an indication in connected mode radio resource control signaling.

9. The apparatus of claim 1, wherein the signaling explicitly indicates whether a synchronization signal block communication of the set of synchronization signal block communications is transmitted and implicitly indicates that the synchronization signal block communication is a two layer transmission.

10. The apparatus of claim 1, wherein the signaling explicitly indicates whether a synchronization signal block communication of the set of synchronization signal block communications is transmitted and explicitly indicates a quantity of transmission layers of the synchronization signal block communication.

11. The apparatus of claim 1, wherein synchronization signal block occasions that include resources for the set of synchronization signal block communications are associated with corresponding random access channel resources.

12. The apparatus of claim 11, wherein each random access channel resource, of the corresponding random access channel resources, corresponds to each spatially division multiplexed beam of each synchronization signal block communication of the set of synchronization signal block communications.

13. An apparatus for wireless communication, comprising:
a memory; and
one or more processors, coupled to the memory, configured to:
receive, during a connected mode or an idle mode and from a network entity, signaling identifying spatial resources of a set of synchronization signal block communications, wherein the set of synchronization signal block communications includes two or more synchronization signal block communications, and wherein the spatial resources correspond to one or more beams;
receive, based at least in part on the spatial resources, at least one of the set of synchronization signal block communications using spatial multiplexing corresponding to the spatial resources, wherein the set of synchronization signal block communications are each received concurrently using the spatial resources associated with the one or more beams in a beam sweeping transmission; and determine, based at least in part on receiving the at least one of the set of synchronization signal block communications, a set of channel measurements.

14. The apparatus of claim 13, wherein the set of channel measurements includes a set of reference signal received power measurements.

15. The apparatus of claim 13, wherein the one or more processors are further configured to:
communicate with the network entity based at least in part on the set of channel measurements.

16. The apparatus of claim 13, wherein the one or more processors, when receiving the at least one of the set of synchronization signal block communications, are configured to:
receive at least one of two or more sets of synchronization signal block communications, which includes the set of synchronization signal block communications, using beam sweeping,
wherein each set of synchronization signal block communications, of the two or more sets of synchronization signal block communications, includes two or more concurrently transmitted, spatially multiplexed synchronization signal block communications.

17. The apparatus of claim 13, wherein synchronization signal block communications, of the set of synchronization signal block communications, are associated with orthogonal demodulation reference signal sequences.

18. The apparatus of claim 17, wherein the orthogonal demodulation reference signal sequences are orthogonal with respect to at least one of: time, frequency, code, or a combination thereof.

19. The apparatus of claim 13, wherein synchronization signal block communications, of the set of synchronization signal block communications, are associated with respective physical broadcast channel payloads that only differ with respect to respective synchronization signal block indices of the physical broadcast channel payloads.

20. The apparatus of claim 13, wherein synchronization signal block communications, of the set of synchronization signal block communications, are associated with a common physical broadcast channel payload.

21. The apparatus of claim 13, wherein the one or more processors are further configured to:
attempt to receive at least one synchronization signal block communication, not in the set of synchronization signal block communications, that is not spatially multiplexed with any other synchronization signal block communication.

22. The apparatus of claim 13, wherein the signaling is at least one of:
an indication in a physical broadcast channel, or
an indication in connected mode radio resource control signaling.

23. The apparatus of claim 13, wherein the signaling explicitly indicates whether a synchronization signal block communication of the set of synchronization signal block communications is to be transmitted and implicitly indicates that the synchronization signal block communication is a two layer transmission.

24. The apparatus of claim 13, wherein the signaling explicitly indicates whether a synchronization signal block communication of the set of synchronization signal block communications is to be transmitted and explicitly indicates a quantity of transmission layers of the synchronization signal block communication.

25. The apparatus of claim 13, wherein synchronization signal block occasions that include resources for the set of synchronization signal block communications are associated with corresponding random access channel resources.

26. The apparatus of claim 25, wherein each random access channel resource, of the corresponding random access channel resources, corresponds to each spatially division multiplexed beam of each synchronization signal block communication of the set of synchronization signal block communications.

27. A method of wireless communication performed by a network entity, comprising:
identifying, during a connected mode or an idle mode of a user equipment, a set of synchronization signal block communications, wherein the set of synchronization signal block communications includes two or more synchronization signal block communications;
transmitting, to the user equipment, signaling identifying spatial resources of the set of synchronization signal block communications, wherein the spatial resources correspond to one or more beams; and
transmitting, based at least in part on the spatial resources, the set of synchronization signal block communications using spatial multiplexing, wherein the set of synchronization signal block communications are each transmitted concurrently using the spatial resources associated with the one or more beams in a beam sweeping transmission.

28. The method of claim 27, wherein synchronization signal block communications, of the set of synchronization signal block communications, are associated with orthogonal demodulation reference signal sequences.

29. A method for wireless communication performed by a user equipment (UE), comprising:
receiving, during a connected mode or an idle mode and from a network entity, signaling identifying spatial resources of a set of synchronization signal block communications, wherein the set of synchronization signal block communications includes two or more synchronization signal block communications, and wherein the spatial resources correspond to one or more beams;
receiving, based at least in part on the spatial resources, at least one of the set of synchronization signal block communications using spatial multiplexing corresponding to the spatial resources, wherein the set of synchronization signal block communications are each received concurrently using the spatial resources associated with the one or more beams in a beam sweeping transmission; and
determining, based at least in part on receiving the at least one of the set of synchronization signal block communications, a set of channel measurements.

* * * * *